United States Patent
Fuld

(10) Patent No.: US 6,286,078 B1
(45) Date of Patent: Sep. 4, 2001

(54) SYSTEM AND METHOD FOR ALLOCATING TAPE DRIVES FOR MULTI-CARTRIDGE FILES

(75) Inventor: Stephen Fuld, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/410,243

(22) Filed: Sep. 30, 1999

(51) Int. Cl.$^7$ .................................................. G06F 13/00
(52) U.S. Cl. ............................................................. 711/111
(58) Field of Search .................................. 711/111, 100; 360/72.1, 72.2

(56) References Cited

U.S. PATENT DOCUMENTS

| | | | |
|---|---|---|---|
| 5,164,909 | * 11/1992 | Leonhardt et al. | 364/478 |
| 5,287,459 | * 2/1994 | Gniewek | 395/275 |
| 5,336,030 | * 8/1994 | Ostwald et al. | 414/277 |
| 5,502,811 | * 3/1996 | Ripberger | 395/182.04 |
| 5,506,986 | * 4/1996 | Healy | 395/600 |
| 5,530,850 | * 6/1996 | Ford et al. | 395/600 |
| 5,700,125 | 12/1997 | Falace et al. | |
| 5,836,735 | 11/1998 | Yeakley et al. | |
| 6,041,329 | * 3/2000 | Kishi | 707/100 |

OTHER PUBLICATIONS

Mayrhauser et al., "Automated Testing Support for a Robot Tape Library," IEEE, pp. 6–14, 3–1993.*
Drapeau et al., "Striped Tape Arrays," IEEE, pp. 257–265, Apr. 1993.*

* cited by examiner

Primary Examiner—Matthew Kim
Assistant Examiner—Stephen Elmore
(74) Attorney, Agent, or Firm—Brooks & Kushman P.C.

(57) ABSTRACT

A system and method for allocating tape drives for multi-cartridge files achieves most of the benefits of allocating two tape drives without the cost of a mostly idle tape drive. The system and method includes allocating a first tape drive to process a first tape cartridge and then allocating a second tape drive to process a second tape cartridge while the first tape cartridge is rewinding after being processed. The second tape cartridge is then mounted into the second tape drive while the first tape cartridge is being rewound. The first tape cartridge is then dismounted from the first tape drive and the second tape drive begins processing the second tape cartridge. The operation is then continued by using other tape drives, which may include the first and second tape drives, to process the tape cartridges. The processing includes writing respective parts of a file to the tape cartridges to store a complete multi-cartridge file. The processing also includes reading respective parts of file stored on the tape cartridges to read a complete multi-cartridge file.

18 Claims, 2 Drawing Sheets

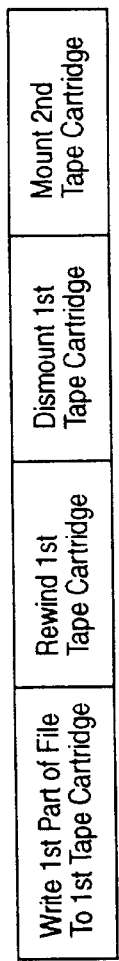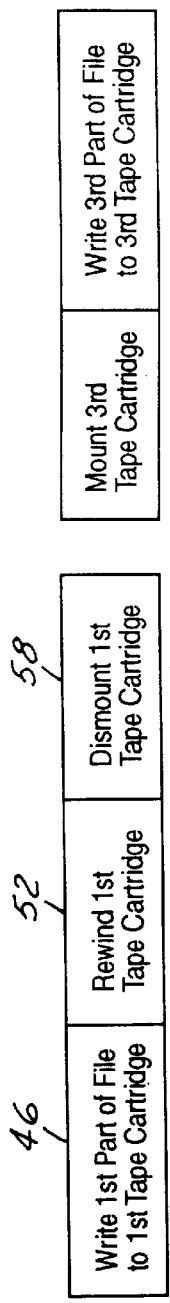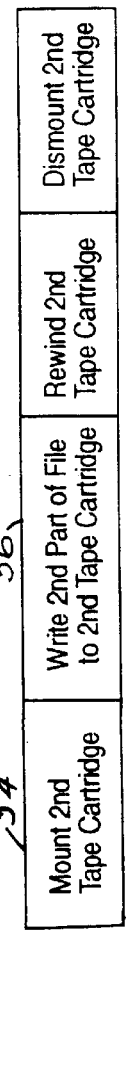

SYSTEM AND METHOD FOR ALLOCATING TAPE DRIVES FOR MULTI-CARTRIDGE FILES

TECHNICAL FIELD

The present invention relates generally to automated cartridge storage libraries and, more particularly, to a system and method for allocating tape drives for multi-cartridge files.

BACKGROUND ART

A popular device for handling large amounts of information in a data processing system is the automated cartridge library. Automated cartridge libraries store and manage large numbers of standardized cassettes containing magnetic tape on which is recorded data. Typically an automated cartridge library comprises arrays of uniquely identified cells, each cell being formed to contain a single tape cartridge. A robot assembly is operable within the automated cartridge to locate a particular cell, retrieve a tape cartridge from the particular cell, convey the tape cartridge to a tape drive, and insert the tape cartridge into the tape drive. The tape drive then reads or writes data to the magnetic tape of the tape cartridge. In this way, a large number of tape cartridges are automatically accessible to a single tape drive. The operation of the automated cartridge library is typically controlled by a host computer communicating with a library control unit associated with the library storage module.

In some applications, such a large amount of data must be stored that it is desirable to employ more than one automated tape library to manage the large number of tape cartridges. Rather than repeating an entire automated cartridge system including the host computer, multiple library storage modules are linked together. Each library storage module contains cell arrays and a robotic assembly and may contain at least one tape drive, but does not require the host computer. Multiple library storage units are arranged adjacent to one another and pass through ports are provided for passing tape cartridges from one library storage module to an adjacent library storage module, where tape cartridges are picked up by the robot assembly of the adjacent library storage module and transported to and inserted in a tape drive of the adjacent library storage module.

Frequently, a file to be read/written from/to a tape cartridge exceeds the storage capacity of the tape cartridge. In this case, multiple tape cartridges are needed to store the file. For reading, each of the tape cartridges store a respective part of the file and together store the complete file. For writing, each of the tape cartridges are to store a respective part of the file and together are to store the complete file. These type of files are referred to as a multi-cartridge files.

Currently, there are two methods for allocating tape drives for multi-cartridge files. Each of the methods will be described with respect to writing respective portions of a file to the tape cartridges. It is to be understood that reading respective portions of a file from the tape cartridges is performed in a similar manner.

The first prior art method is to allocate one tape drive for the multiple tape cartridges and is described with reference to the time line illustrated in FIG. 1. It is to be understood that the time line is not drawn to scale. In this method, a tape drive is allocated to store a first part of a file on a first tape cartridge. The robot assembly retrieves the first tape cartridge from its storage cell and mounts it into the tape drive. The tape drive then writes the first part of the file to the first tape cartridge. The tape drive then rewinds the first tape cartridge after the first part of the file has been written. The robot assembly then dismounts the first tape cartridge from the tape drive and moves it to its storage cell. The tape drive is then used to store a second part of the file on a second tape cartridge. The robot assembly retrieves the second tape cartridge from its storage cell and mounts it into the tape drive. The tape drive then writes the second part of the file to the second tape cartridge. The process is then continued using one tape drive until all of the parts of the file have been written to respective tape cartridges. A disadvantage associated with allocating one tape drive for the multiple tape cartridges is that the tape drive cannot write data to a second tape cartridge while a first tape cartridge is being rewound and unmounted, and while the second tape cartridge is being mounted. Accordingly, it takes a long time to write a multi-cartridge file to multiple cartridges using one tape drive.

The second prior art method is to allocate two tape drives for the multiple tape cartridges and is described with reference to the time line illustrated in FIG. 2. It is to be understood that the time line is not drawn to scale. In this method, a first tape drive is allocated to store a first part of a file on a first tape cartridge and a second tape drive is allocated to store a second part of the file on a second tape cartridge. The robot assembly retrieves the first tape cartridge from its storage cell and mounts it into the first tape drive. The first tape drive then writes the first part of the file to the first tape cartridge. While the first tape drive is writing to the first tape cartridge, the robot assembly retrieves and mounts the second tape cartridge into the second tape drive. The second tape drive then remains idle as the first tape drive continues writing to the first tape cartridge. Generally, writing to a tape cartridge takes more time than rewinding, dismounting, and mounting a tape cartridge.

The first tape drive then rewinds the first tape cartridge after the first part of the file has been written. Upon the first tape drive beginning to rewind the first tape cartridge, the second tape drive starts to write the second part of the file to the second tape cartridge. While the second tape drive is writing to the second tape cartridge, the first tape cartridge rewinds and the robot assembly dismounts the first tape cartridge from the first tape drive and mounts the third tape cartridge (if required). The first tape drive then remains idle as the second tape drive continues to write to the second tape cartridge. The process is then continued writing alternately between the two tape drives until all of the parts of the file have been written to respective tape cartridges. A disadvantage associated with allocating two tape drives for the multiple tape cartridges is that each of the tape drives is allocated but sits idle for extended periods of time. Thus they are unavailable for other users.

Further, both of the prior art methods fix the tape drive allocation at the beginning of writing to the first tape cartridge. Thus, if the second or subsequent tape cartridges are in different libraries from the libraries in which the tape drives are located then pass through operations between the libraries are necessary.

What is needed is a system and method for allocating tape drives for multi-cartridge files that achieve most of the benefits of allocating two tape drives without the cost of a mostly idle tape drive. The needed system and method would also reduce the probability of requiring pass through operations on subsequent tape cartridges.

SUMMARY OF THE INVENTION

Accordingly, it is an object of the present invention to provide a system and method in which a first tape drive processes a first tape cartridge and then a second tape cartridge is mounted in a second tape drive for processing while the first tape cartridge is rewinding after being processed.

It is another object of the present invention to provide a system and method in which a first tape drive is allocated to process a first tape cartridge and then a second tape drive is allocated to process a second tape cartridge after the first tape cartridge has been processed.

It is a further object of the present invention to provide a system and method in which a first tape drive is allocated to process a first tape cartridge to read/write a first part of a file and then a second tape drive is allocated to process a second tape cartridge to read/write a second part of the file after the first cartridge has been processed.

It is still another object of the present invention to provide a system and method in which a second tape drive is allocated to process a second tape cartridge after a first tape drive has been allocated to process a first tape cartridge and then unallocated after processing the first tape cartridge.

It is still a further object of the present invention to provide a system and method in which a first tape drive is allocated to process a first tape cartridge, a second tape drive is allocated to process a second tape cartridge after the first tape drive processes the first tape cartridge, and then the first tape drive is reallocated to process a third tape cartridge after the second tape drive processes the second tape cartridge.

It is still yet another object of the present invention to provide a system and method in which a first tape drive is allocated to process a first tape cartridge, a second tape drive is allocated to process a second tape cartridge after the first tape drive processes the first tape cartridge, and then a third tape cartridge is reallocated to process a third tape cartridge after the second tape drive processes the second tape cartridge.

In carrying out the above objects and other objects, the present invention provides a method for a tape storage library having at least two tape drives and a robot assembly for mounting and dismounting tape cartridges in the tape drives. The method includes mounting a first tape cartridge in a first tape drive using the robot assembly. The first tape cartridge is then processed with the first tape drive. A first allocation signal is then generated after the first tape cartridge has been processed. A second tape cartridge is then mounted in a second tape drive using the robot assembly upon receipt of the first allocation signal by the robot assembly. The second tape cartridge is then processed with the second tape drive.

Preferably, the method further includes rewinding the first tape cartridge with the first tape drive after the first tape cartridge has been processed and then dismounting the first tape cartridge from the first tape drive using the robot assembly while the second tape cartridge is being processed with the second tape drive and the first tape drive is being deallocated. A second allocation signal is then generated after the second tape cartridge has been processed. A third tape cartridge is then mounted in either the first tape drive or a third tape drive, i.e., any other available tape drive, using the robot assembly upon receipt of the second allocation signal by the robot assembly. The third tape cartridge is then processed with either the first tape drive or the third tape drive. The second tape cartridge is then rewound with the second tape drive after the second tape cartridge has been processed. The second tape cartridge is then dismounted from the second tape drive using the robot assembly while the third tape cartridge is being processed.

Alternatively, the method may include rewinding the first tape cartridge with the first tape drive after the first tape cartridge has been processed and mounting the second tape cartridge in the second tape drive while the first tape cartridge is rewinding.

Processing the first and second tape cartridges may include writing information of a first and second part, respectively, of a file to the first and second tape cartridges. Similarly, processing the first and second tape cartridges may include reading information of a first and second part, respectively, of a file from the first and second tape cartridges.

In carrying out the above objects and other objects, the present invention further provides a tape storage library system including first and second tape drives for processing tape cartridges and a robot assembly for mounting and dismounting tape cartridges in the tape drives. The system further includes a controller operable with the first and second tape drives and the robot assembly to mount a first tape cartridge in the first tape drive, process the first tape cartridge in the first tape drive, mount a second tape cartridge in the second tape drive after the first tape cartridge has been processed, and then process the second tape cartridge in the second tape drive.

The advantages accruing to the present invention are numerous. For instance, none of the tape drives sit idle while a tape drive is processing a tape cartridge. This frees the tape drives not processing a tape cartridge for a first multi-cartridge file to process a tape cartridge for a different file. The robot assembly can mount the needed tape cartridge in one tape drive before dismounting another tape cartridge in the other tape drive. This allows shadowing any rewind and dismount time. As soon as the one tape drive is allocated, the other tape drive is unallocated so it is available for other use. If no other tape drive is available, the present invention transparently defaults back to the current, single tape drive allocation method.

The above objects and other objects, features, and advantages embodiments of the present invention are readily apparent from the following detailed description of the best mode for carrying out the present invention when taken in connection with the accompanying drawings.

BRIEF DESCRIPTION OF THE DRAWINGS

FIG. 1 illustrates a time line showing operation of a prior art single tape drive allocation method;

FIG. 2 illustrates a time line showing operation of a prior art two tape drive allocation method;

FIG. 5 illustrates a time line showing operation of the system and method of the present invention.

BEST MODES FOR CARRYING OUT THE INVENTION

Figure 3:
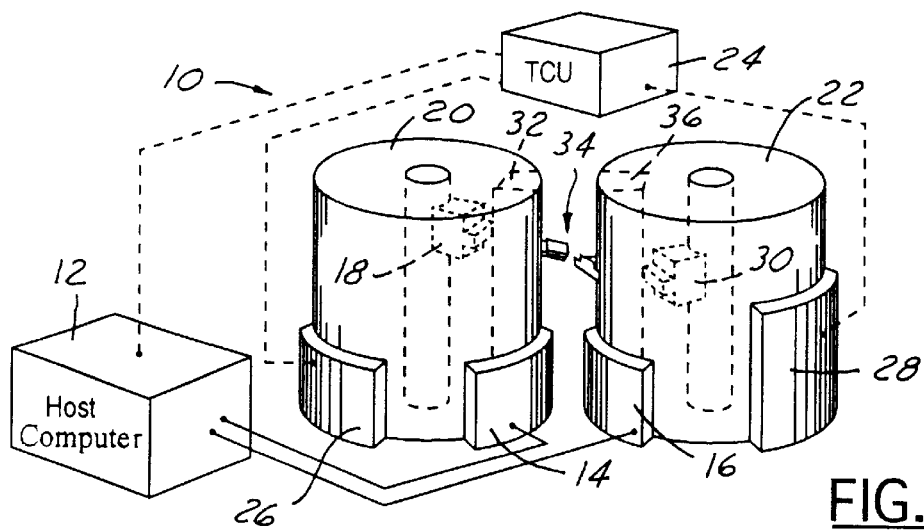
FIG. 3 illustrates an automated cartridge library in accordance with the present invention using a pass through port between two library storage modules.

Referring now to FIG. 3, an automated tape cartridge library system 10 in accordance with the present invention is illustrated. A host computer 12 directs operation of library system 10. Host computer 12 communicates with library control units 14 and 16. Library control unit 14 governs the operation of a robot assembly 18 within a library storage module 20. Library control unit 14 interprets signals from host computer 12 and provides appropriate signals to robot assembly 18 to control its motion and operation. Signals from host computer 12 control the handling and storage of tape cartridges within library storage modules 20 and 22. Signals between host computer 12 and library storage modules 20 and 22 are conducted over wires represented by the solid lines in FIG. 3. Data to be written to a tape cartridge (not shown in FIG. 3) or read from a tape cartridge is communicated over wires represented by the dotted lines of FIG. 3 through a tape control unit 24. Tape drive control unit 24 controls the operation of tape drive 26 associated with library storage module 20 and tape drive 28 associated with library storage module 22. Each of library storage modules 20 and 22 may have more than one tape drive. Similarly, only one of library storage modules 20 and 22 may have a tape drive. In this case, the tape cartridges of the library storage module lacking a tape drive are passed through to the other library storage module having a tape drive.

In general terms, if there is a need to read/write data from/to a tape cartridge in library storage module 22, a robot assembly 30, in response to signals from host computer 12, retrieves the appropriate tape cartridge from a storage cell and inserts the tape cartridge in tape drive 28. Signals from host computer 12 through tape control unit 24 then control the reading/writing of data from/to the tape cartridge.

If, however, there is a need to read/write data from/to a tape cartridge stored in library storage module 20 and tape drive 26 is not available, then the following operations occur. Host computer 12 communicates with library control unit 14 to cause robot assembly 18 of library storage module 20 to retrieve the subject tape cartridge from its storage cell. Through further signals from host computer 12, robot assembly 18 delivers the subject tape cartridge to a designated cell (not shown in FIG. 3) in cell array 32. The designated cell in cell array 32 allows the subject tape cartridge to enter pass through port 34 which passes the subject tape cartridge to a designated cell in cell array 36 within library storage module 22. Host computer 12 next directs robot assembly 30 to retrieve the subject tape cartridge from the cell in cell array 36 in which it was deposited by pass through port 34. Further signals from host computer 12 direct robot assembly 30 to insert the subject tape cartridge into tape drive 28 or a second tape drive of library storage module 22 (not shown in FIG. 3). Host computer 12 then communicates with tape control unit 24 which operates tape drive 28 to read/write data from/to the subject tape cartridge requested by host computer 12. Finally, tape control unit 24 communicates the requested data back to host computer 12 for reading and communicates data to tape drive 28 for writing.

Figure 4:
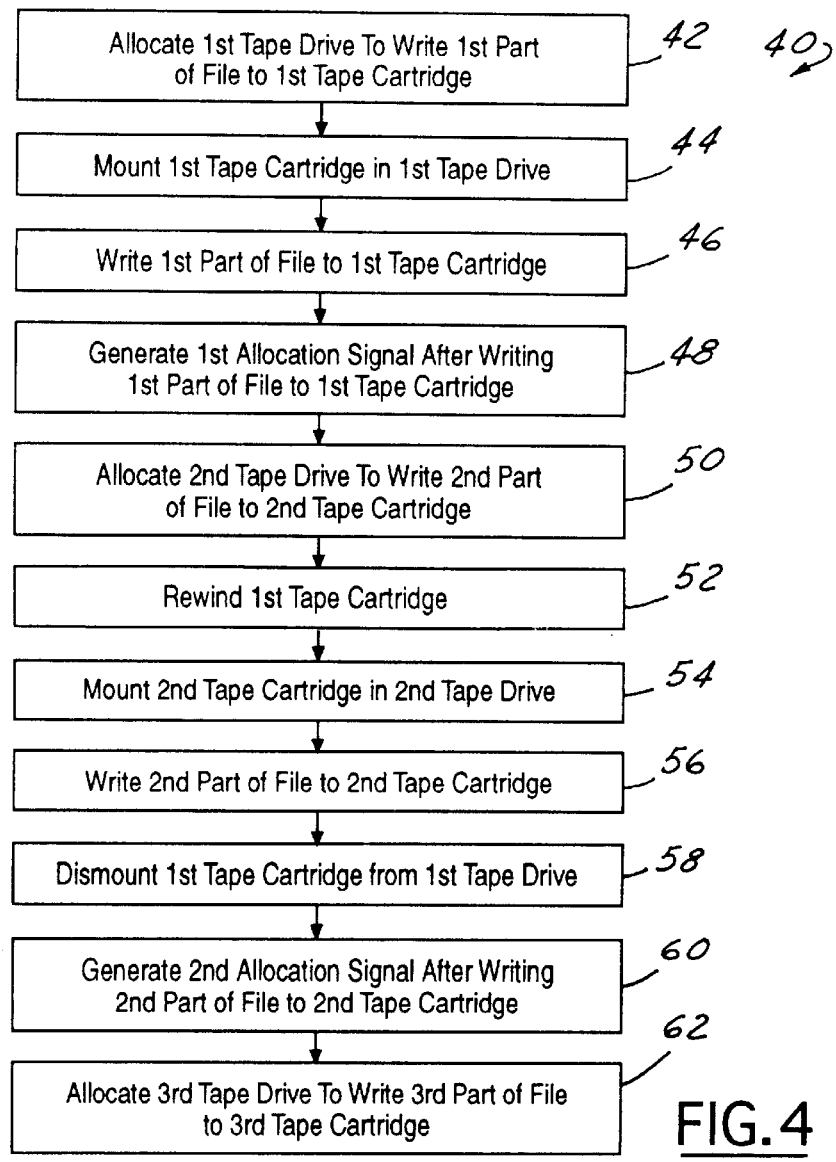
FIG. 4 illustrates a flow chart showing operation of the system and method of the present invention.

The present invention is described in greater detail with reference to the flow chart illustrated in FIG. 4, the time line illustrated in FIG. 5, and with continual reference to FIG. 3. It is to be understood that the time line shown in FIG. 5 is not to scale. The present invention includes host computer 12, library storage module 20, robot assembly 18, tape drive 26, and at least a second tape drive such as tape drive 28 of library storage module. The second tape drive may also be located at library storage module 20 (not shown in FIG. 3). The present invention processes a group of tape cartridges in which each tape cartridge stores a respective part of a file. The present invention will be described with respect to writing respective parts of a file to tape cartridges. It is to be understood that reading respective parts of a file from tape cartridges is performed in a similar manner.

Flow chart 40 begins with host computer 12 allocating a first tape drive 26 to write a first part of a file to a first tape cartridge as shown in box 42. In response to this allocation, robot assembly 18 retrieves and mounts the first tape cartridge in first tape drive 26 as shown in box 44. First tape drive 26 then writes the first part of the file from host computer 12 to the first tape cartridge as shown in box 46. Host computer 12 then generates a first allocation signal after first tape drive 26 writes the first part of the file to the first tape cartridge as shown in box 48. Preferably, host computer 12 generates the first allocation signal when the end of volume (EOV) of the first part of the file has been reached. The first allocation signal allocates second tape drive 28 to write a second part of the file to a second tape cartridge as shown in box 50. First tape drive 26 then rewinds the first tape cartridge as shown in box 52. Upon receipt of the first allocation signal, robot assembly 18 retrieves and mounts a second tape cartridge in second tape drive 28 as shown in box 54. Preferably, robot assembly 18 retrieves and mounts the second tape cartridge in second tape drive 28 while first tape drive 26 is rewinding the first tape cartridge.

Second tape drive 28 then writes the second part of the file from host computer 12 to the second tape cartridge as shown in box 56. After mounting the second tape cartridge in second tape drive 28 and after the first tape cartridge has been rewound, robot assembly 18 dismounts the first tape cartridge from first tape drive 26 as shown in box 58. First tape drive 26 is then deallocated making it available for other use. Robot assembly 18 dismounts the first tape cartridge while second tape drive 28 is writing to the second tape cartridge. Host computer 12 then generates a second allocation signal after second tape drive 28 writes the second part of the file to the second tape cartridge. Host computer 12 then generates a second allocation signal after second tape drive 28 writes the second part of the file to the second tape cartridge as shown in box 60. The second allocation signal allocates a third tape drive to write a third part of the file to a third tape cartridge as shown in box 62. The third tape drive may be first tape drive 26 depending upon the availability of the tape drives. If only first and second tape drives 26 and 28 are available, the operation is then continued by alternately using first and second tape drives 26 and 28 to write respective parts of the file to subsequent tape cartridges until the complete file has been written. If more than two tape drives are available, the operation is then continued by using any selected combination of the tape drives to write the file parts to respective tape cartridges until the complete file has been written.

As shown in the time line illustrated in FIG. 5, assuming only first and second tape drives 26 and 28 are available, neither of first and second tape drives 26 and 28 sit idle while the other tape drive is processing a tape cartridge. Thus, first and second tape drives 26 and 28 can perform other activities while the other tape drive is processing a tape cartridge.

A further advantage of the present invention in allowing changing tape drives for each tape cartridge is that it reduces or eliminates the probability of requiring pass through operations on subsequent cartridges. In a library system having multiple library modules, the new allocation may be able to be done to a tape drive that is logically closer to the new tape cartridge such as in the same library storage module. This would reduce or eliminate the need for a performance sapping pass through operation. This would further reduce the elapsed time of the processing job and reduce robot assembly use in general.

Thus it is apparent that there has been provided, in accordance with the present invention, a tape storage library system and method that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for a tape storage library having at least two tape drives and a robot assembly for mounting and dismounting tape cartridges in the tape drives, the method comprising:

mounting a first tape cartridge in a first tape drive using the robot assembly;

processing the first tape cartridge with the first tape drive;

generating a first allocation signal after the first tape cartridge has been processed;

providing the first allocation signal to the robot assembly;

mounting a second tape cartridge in a second tape drive using the robot assembly upon receipt of the first allocation signal by the robot assembly;

processing the second tape cartridge with the second tape drive;

rewinding the first tape cartridge with the first tape drive after the first tape cartridge has been processed;

dismounting the first tape cartridge from the first tape drive using the robot assembly while processing the second tape cartridge with the second tape drive; and deallocating the first tape drive in response to the first allocation signal.

2. The method of claim 1 further comprising:

generating a second allocation signal after the second tape cartridge has been processed;

providing the second allocation signal to the robot assembly;

mounting a third tape cartridge in the first tape drive using the robot assembly upon receipt of the second allocation signal by the robot assembly; and processing the third tape cartridge with the first tape drive.

3. The method of claim 2 further comprising:

rewinding the second tape cartridge with the second tape drive after the second tape cartridge has been processed; and dismounting the second tape cartridge from the second tape drive using the robot assembly while processing the third tape cartridge with the first tape drive.

4. The method of claim 1 further comprising:

generating a second allocation signal after the second tape cartridge has been processed;

providing the second allocation signal to the robot assembly;

mounting a third tape cartridge in a third tape drive using the robot assembly upon receipt of the second allocation signal by the robot assembly; and processing the third tape cartridge with the third tape drive.

5. The method of claim 4 further comprising:

rewinding the second tape cartridge with the second tape drive after the second tape cartridge has been processed; and dismounting the second tape cartridge from the second tape drive using the robot assembly while processing the third tape cartridge with the third tape drive.

6. The method of claim 1 wherein:

processing the first tape cartridge with the first tape drive includes writing information of a first part of a file to the first tape cartridge; and processing the second tape cartridge with the second tape drive includes writing information of a second part of the file to the second tape cartridge.

7. The method of claim 1 wherein:

processing the first tape cartridge with the first tape drive includes reading information of a first part of a file from the first tape cartridge; and processing the second tape cartridge with the second tape drive includes reading information of a second part of the file from the second tape cartridge.

8. A method for a tape storage library having at least two tape drives and a robot assembly for mounting and dismounting tape cartridges in the tape drives, wherein the tape cartridges each store a part of a file, the method comprising:

mounting a first tape cartridge in a first tape drive using the robot assembly;

reading a first part of the file stored on the first tape cartridge with the first tape drive;

generating an allocation signal after the first part of the file stored on the first tape cartridge has been read;

providing the allocation signal to the robot assembly;

mounting a second tape cartridge in a second tape drive using the robot assembly upon receipt of the allocation signal by the robot assembly;

reading a second part of the file stored on the second tape cartridge with the second tape drive;

rewinding the first tape cartridge with the first tape drive after the first part of the file stored on the first tape cartridge has been read;

dismounting the first tape cartridge from the first tape drive using the robot assembly while reading the second part of the file stored on the second tape cartridge with the second tape drive; and deallocating the first tape drive in response to the first allocation signal.

9. The method of claim 8 further comprising:

generating a second allocation signal after the second part of the file stored on the second tape cartridge has been read;

providing the second allocation signal to the robot assembly;

mounting a third tape cartridge in the first a third tape drive using the robot assembly upon receipt of the second allocation signal by the robot assembly; and reading a third part of the file stored on the third tape cartridge with the third tape drive.

10. The method of claim 9 further comprising:

rewinding the second tape cartridge with the second tape drive after the second part of the file stored on the second tape cartridge has been read; and dismounting the second tape cartridge from the second tape drive using the robot assembly while reading the third part of the file stored on the third tape cartridge with the third tape drive.

11. A method for a tape storage library having at least two tape drives and a robot assembly for mounting and dismounting tape cartridges in the tape drives, the method comprising:

mounting a first tape cartridge in a first tape drive using the robot assembly;

recording a first part of a file on the first tape cartridge with the first tape drive;

generating an allocation signal after the first part of the file has been recorded on the first tape cartridge;

providing the allocation signal to the robot assembly;

mounting a second tape cartridge in a second tape drive using the robot assembly upon receipt of the allocation signal by the robot assembly;

recording a second part of the file on the second tape cartridge with the second tape drive;

rewinding the first tape cartridge with the first tape drive after the first part of the file has been recorded on the first tape cartridge; and dismounting the first tape cartridge from the first tape drive using the robot assembly while recording the second part of the file on the second tape cartridge with the second tape drive.

12. The method of claim 11 further comprising:

generating a second allocation signal after the second part of the file has been recorded on the second tape cartridge;

providing the second allocation signal to the robot assembly;

mounting a third tape cartridge in a third tape drive using the robot assembly upon receipt of the second allocation signal by the robot assembly; and recording a third part of the file on the third tape cartridge with the third tape drive.

13. The method of claim 12 further comprising:

rewinding the second tape cartridge with the second tape drive after the second part of the file has been recorded on the second tape cartridge; and dismounting the second tape cartridge from the second tape drive using the robot assembly while recording the third part of the file on the third tape cartridge with the third tape drive.

14. A tape storage library system comprising:

a first tape drive for processing tape cartridges;

a second tape drive for processing tape cartridges;

a robot assembly for mounting and dismounting tape cartridges in the tape drives; and a controller operable with the first and second tape drives and the robot assembly to mount a first tape cartridge in the first tape drive, process the first tape cartridge in the first tape drive, generate a first allocation signal after the first tape cartridge has been processed, mount a second tape cartridge in the second tape drive after the first tape cartridge has been processed in response to the allocation signal, and then process the second tape cartridge in the second tape drive;

wherein the controller is further operable with the first and second tape drives and the robot assembly to rewind the first tape cartridge with the first tape drive after the first tape cartridge has been processed, and dismount the first tape cartridge from the first tape drive while the second tape cartridge is being processed in the second tape drive.

15. The system of claim 14 further comprising:

a third tape drive for processing tape cartridges, wherein the controller is operable with the second and third tape drives and the robot assembly to generate a second allocation signal after the second tape cartridge has been processed, mount a third tape cartridge in the third tape drive after the second tape cartridge has been processed in response to the second allocation signal, and then process the third tape cartridge in the third tape drive.

16. The system of claim 15 wherein:

the controller is further operable with the second and third tape drives and the robot assembly to rewind the second tape cartridge with the second tape drive after the second tape cartridge has been processed, and dismount the second tape cartridge from the second tape drive while the third tape cartridge has been processed with the third tape drive.

17. The system of claim 14 wherein:

the controller processes the first tape cartridge with the first tape drive to write information of a first part of a file to the first tape cartridge and processes the second tape cartridge with the second tape drive to write information of a second part of the file to the second tape cartridge.

18. The system of claim 14 wherein:

the controller processes the first tape cartridge with the first tape drive to read information of a first part of a file from the first tape cartridge and processes the second tape cartridge with the second tape drive to read information of a second part of the file from the second tape cartridge.

* * * * *